(12) United States Patent
Matherly et al.

(10) Patent No.: US 9,643,865 B2
(45) Date of Patent: May 9, 2017

(54) REDUCTION OR REMOVAL OF SULFATES FROM WATER

(71) Applicant: BAKER HUGHES INCORPORATED, Houston, TX (US)

(72) Inventors: Ronald M. Matherly, Sugar Land, TX (US); Jiasheng Cao, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 210 days.

(21) Appl. No.: 14/491,136

(22) Filed: Sep. 19, 2014

(65) Prior Publication Data

US 2015/0083669 A1 Mar. 26, 2015

Related U.S. Application Data

(60) Provisional application No. 61/881,817, filed on Sep. 24, 2013.

(51) Int. Cl.
*C02F 1/52* (2006.01)
*C02F 101/10* (2006.01)
*C02F 103/06* (2006.01)
*C02F 103/10* (2006.01)
*C02F 1/56* (2006.01)

(52) U.S. Cl.
CPC .............. *C02F 1/5236* (2013.01); *C02F 1/56* (2013.01); *C02F 2101/101* (2013.01); *C02F 2103/06* (2013.01); *C02F 2103/10* (2013.01)

(58) Field of Classification Search
None
See application file for complete search history.

(56) References Cited

U.S. PATENT DOCUMENTS

| | | |
|---|---|---|
| 2,889,197 A | 6/1959 | Baumann |
| 3,378,336 A | 4/1968 | D'Arcy et al. |
| 3,653,829 A | 4/1972 | Gelblum |
| 2005/0238556 A1 | 10/2005 | Pakulski et al. |
| 2012/0037568 A1* | 2/2012 | Karrs .................... C02F 1/5236 210/709 |

FOREIGN PATENT DOCUMENTS

CN 103305848 A * 9/2013

* cited by examiner

*Primary Examiner* — Chester Barry
(74) *Attorney, Agent, or Firm* — Mossman, Kumar & Tyler, P.C.

(57) ABSTRACT

Some waters have high sulfate contents, such as acid mine drainage (AMD), which makes them unsuitable for use in fracturing fluids and difficult to dispose. Such waters may be treated with a solution of barium chloride to react with the sulfate ion of the sulfates and precipitate the sulfates as barium sulfate. Not all of the sulfates needs to be removed for the reclaimed water to be useful in formulating a fracturing fluid. The by-product of the reaction is almost pure barium sulfate, which is an inert, commercially valuable material that may be used in drilling fluids, paint and other industries.

20 Claims, No Drawings

REDUCTION OR REMOVAL OF SULFATES FROM WATER

CROSS-REFERENCE TO RELATED APPLICATION

This application claims the benefit of Provisional Patent Application No. 61/881,817 filed Sep. 24, 2013, which is incorporated by reference herein in its entirety.

TECHNICAL FIELD

The present invention relates to methods for removing or reducing the amount of sulfates from water containing them and more particularly relates to methods for removing or reducing the amount of sulfates from water containing them, such as, but not limited to, acid mine drainage (AMD)

TECHNICAL BACKGROUND

Water is a valuable resource. Some waters have a high sulfate content, such as acid mine drainage (AMD), which makes them unsuitable as water for many purposes, such as use in a hydraulic fracturing fluid, and may also make them difficult to dispose.

Acid mine drainage, acid and metalliferous drainage (AMD), or acid rock drainage (ARD), refers to the outflow of acidic water from metal mines or coal mines (usually abandoned). However, other areas where the earth has been disturbed (e.g. construction sites, subdivisions, transportation corridors, etc.) may also contribute acid rock drainage to the environment. In many places the liquid that drains from coal stocks, coal handling facilities, coal washeries, and even coal waste tips can be highly acidic, and in such cases it is treated as acid rock drainage. Acid rock drainage occurs naturally within some environments as part of the rock weathering process but may be exacerbated by large-scale earth disturbances characteristic of mining and other large construction activities, usually within rocks containing an abundance of sulfide minerals.

The same type of chemical reactions and processes may occur through the disturbance of acid sulfate soils formed under coastal or estuarine conditions after the last major sea level rise, and constitute a similar environmental hazard.

A significant amount of scientific research has been conducted to determine the chemical reactions that create acidity and lead to the precipitation of dissolved metals, but despite improvements in both prediction and prevention methods, acid mine drainage problems persist. The acidity of coal-mine drainage is caused primarily by the oxidation of the mineral pyrite (iron sulfide or $FeS_2$), which is found in coal, coal overburden, and mine waste piles.

The sulfates contained in AMD or ARD may include, but are not necessarily limited to soluble sulfates, iron sulfate, sodium sulfate, calcium sulfate, magnesium sulfate, potassium sulfate, aluminum sulfate, zinc sulfate, and the like.

There have been many attempts to reclaim water, such as produced water from hydrocarbon recovery processes, and reuse it as fracturing feed water, commonly referred to as "frac water". Frac water is a term that refers to water suitable for use in the creation of fracturing (frac) gels which are used in hydraulic fracturing operations. Frac gels may be created by combining frac water with a polymer, such as guar gum, and in some applications a cross-linker, typically borate-based, to form a fluid that gels upon hydration of the polymer. Several chemical additives generally will be added to the frac gel to form a treatment fluid specifically designed for the anticipated wellbore, reservoir and operating conditions. In many instances, it is not necessary to completely purify the water before it may be used as frac water. Frac gels may also be formulated by adding effective amounts of viscoelastic surfactants (VESs) to frac water.

It would thus be very desirable to discover relatively simple and inexpensive methods for reducing the levels of sulfates in waters containing them, particularly quickly and easily reducing the level of sulfates in water while not necessarily removing all of the sulfates or completely purifying the water.

SUMMARY

There is provided, in one non-limiting form, a method of decreasing or removing at least one sulfate from water, where the method involves contacting water comprising at least one sulfate at a first sulfate concentration with an effective amount of an aqueous solution of barium chloride in an amount effective to at least partially reacting the sulfate with the barium chloride to form barium sulfate. The method also includes at least partially separating the barium sulfate recovering water having a second sulfate concentration smaller than the first sulfate concentration. Alternatively, the recovered water may then be used to formulate a fracturing fluid.

DETAILED DESCRIPTION

It has been discovered that AMD, ARD and other waters containing sulfates may be treated with a solution of barium chloride ($BaCl_2$ or $BaCl_2.2H_2O$) to precipitate the sulfates as barium sulfate ($BaSO_4$). While barium chloride ($BaCl_2$) in solid form may be used to treat the waters, the solid form is highly poisonous, i.e. an inhalation poison. Thus, it is much safer for the liquid form of barium chloride to be used to treat the waters. Precipitating the sulfates from AMD, ARD, and other waters by adding $BaCl_2$ or $BaCl_2.2H_2O$ to the waters is described in more detail below.

In aqueous solution barium sulfate behaves as a simple salt. Its solutions react with sulfate ions to produce a fine white precipitate of barium sulfate, according to reaction (I):

$$Ba^{2+}_{(aq)} + SO_4^{2-}_{(aq)} \rightarrow BaSO_{4(s)} \qquad (I)$$

The amount of barium chloride added to the water may determine the amount of sulfates precipitated from the water. As noted, for use in a frac fluid, not all of the sulfates need to be separated or precipitated. The by-product of reaction (I) is almost pure barium sulfate, which is an inert, commercially valuable material for use in drilling fluids (to increase density), in paint and in other industries. Thus, the method herein produces two useable products from water that can be a problem for the mining industry. The barium sulfate is considered "almost pure" when barium sulfate comprises more than 90 wt % of the formed products from reaction (I); alternatively from about 95 wt % independently to about 99.99 wt %, or from about 99 wt % independently to about 99.9 wt %.

In one non-limiting embodiment, the treated water may contain between about 100 to about 300 mg/L sulfates. Treating with this method to achieve levels lower than about 100 mg/L sulfates may cause overtreating and cause barium to be present in the treated water, which can be problematic for subsequent use and/or disposal. However, fresh untreated AMD water may be mixed back into the treated water to eliminate any overtreatment in one non-limiting embodiment. If the sulfates are greater than about 300 mg/L, then the water may not be useful for certain frac fluids. The first sulfate concentration in the untreated water (e.g. AMD) may be as high as 1000 mg/L, alternatively as high as 2000 mg/L.

Characteristics and advantages of the present disclosure and additional features and benefits will be readily apparent to those skilled in the art upon consideration of the following detailed description of exemplary embodiments of the present disclosure. It should be understood that the description herein, being of example embodiments, are not intended to limit the claims of this patent application, any patent granted hereon or any patent or patent application claiming priority hereto. On the contrary, the intention is to cover all modifications, equivalents and alternatives falling within the spirit and scope of the claims. Many changes may be made to the particular embodiments and details disclosed herein without departing from such scope.

As used herein and throughout various portions (and headings) of this patent application, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ". Further, reference herein and in the appended claims to components and aspects in a singular tense does not necessarily limit the present disclosure or appended claims to only one such component or aspect, but should be interpreted generally to mean one or more, as may be suitable and desirable in each particular instance.

In more detail, an aqueous $BaCl_2.2H_2O$ solution is the only chemical needed. The aqueous solution may be made from $BaCl_2$ or $BaCl_2.2H_2O$ or any other hydrated form of barium chloride. The aqueous solution may also be made from barium nitrate, but is expected to be too expensive when made from that source. No other chemical needs to be added to make the method work.

However, a flocculant may be added to the water to help precipitate the barium sulfate faster after contacting the water with the aqueous solution of barium chloride (e.g. $BaCl_2.2H_2O$ solution). Suitable flocculants include, but are not necessarily limited to, cationic flocculants, anionic flocculants, non-ionic polymer flocculants, and the like. Particular non-limiting examples of suitable flocculants may be or include polyacrylamide (PAM), polyacrylic acid, polyacrylate, and the like. The flocculant may be added after all of the barium chloride has been added to the aqueous solution but prior to the desired timing of precipitation of the sulfates.

The concentration of barium chloride in the aqueous solution may range from about 10 wt % independently to about 35 wt %; alternatively from about 23 wt % independently to about 30 wt %. When the word "independently" is used herein with respect to a range, it is intended that any lower threshold may be used together with any upper threshold to create a valid, suitable alternative range. Solutions of 25 wt % barium chloride have been successfully tested. It is difficult to achieve a concentration much higher than about 35 wt % due to the solubility limits of $BaCl_2.2H_2O$.

There is a limit on the concentration of carbonates and bicarbonates in the aqueous solution of barium chloride. The water needs to be low in carbonates/bicarbonates, otherwise it forms barium carbonate. Barium carbonate is water insoluble, but mildly acid soluble. A problem may occur when the produced barium sulfate by-product is tested for heavy metals by TCLP (Toxic Characteristic Leaching Procedure—EPA Protocol). Under these conditions, the barium sulfate may show unexpectedly high levels of barium from the barium carbonate. Untreated water may be added back to the BaSO4 to aid in the removal of free barium.

Alternatively, to decrease the amount of free barium, the carbonates/bicarbonates may be below about 450 mg/L within the aqueous solution. This does not seem to be a problem in the treating water method because the barium favors a reaction with sulfate to form barium sulfate instead of reacting with the carbonates or bicarbonates to form barium carbonate. However, if no sulfates are available in the water being treated, the barium within the barium chloride will form barium carbonate when the barium is exposed to carbonates or bicarbonates. To avoid the high carbonates/bicarbonates content problem, the barium chloride aqueous solution may be filtered after it is prepared. The filtration removes any barium carbonate formed, but formation of barium carbonate decreases the availability of the barium for reaction with sulfates to form barium sulfate.

It has also been observed that some residual soluble barium may be detected in the TCLP analysis when sulfates fall below 200-300 mg/L in the treated water. When this occurs, the precipitated barium sulfate (as a solid) may be further washed with untreated AMD water (having a high concentration of sulfates). The soluble barium may be effectively removed by this secondary barium recovery procedure, which may also increase the particle size and enhance precipitation speed of the barium sulfate.

The effective amount of the solution having barium chloride to treat the sulfate-containing water may range from about 0.025 vol % independently to about 3 vol % of the treated water; alternatively from about 0.025 vol % independently to about 1 vol % of the treated water.

The method is relatively simple. The temperature of the treatment is not very important, as long as the water and/or the aqueous solution are not frozen because the reaction proceeds in the liquid phase.

It has been observed that something affects the particle size of the barium sulfate formed, but this is not understood at present. In any event, the particle size variations that have been observed are not very large.

As noted, once the precipitated barium sulfate is removed from the treated water, the water may be used to formulate a fracturing fluid. The precipitated barium sulfate is relatively pure; in one non-limiting embodiment at least 99 wt % pure, alternatively at least 95 wt % pure, and in another non-restrictive version, at least 90 wt % pure.

It is emphasized that the initial water being treated in one non-limiting embodiment may be any water that undesirably contains sulfates, including but not necessarily limited to, acid mine drainage (AMD), acid metalliferous drainage, acid rock drainage (ARD), ground water, waste water, industry water, oilfield produced water, flowback water, and combinations of these.

As noted, it is not necessary that all of the sulfates within the water be completely separated or removed from the water for the methods herein to be considered successful.

For instance, it may only be necessary to separate/remove enough of the sulfates so as to not adversely interfere with the next use of the water. If the water has the sulfate concentration decreased to a sufficient extent, so that it does not interfere with the use of the water as frac water, e.g. the sulfate concentration does not interfere with the polymer gelling in the water to a problematic extent, this may be sufficient. As noted, in one non-limiting embodiment the resulting decreased sulfate content water may contain less than 300 mg/L sulfates, alternatively between about 100 to about 300 mg/L sulfates. A non-limiting goal may be to reduce sulfate levels sufficient to reuse the water in other oilfield applications or other applications. Of course, it is acceptable if all, or essentially all, of the sulfate contaminants are separated and/or removed.

The invention will now be described with respect to particular embodiments of the invention which are not intended to limit the invention in any way, but which are simply to further highlight or illustrate the invention.

EXAMPLE 1

Sulfate Removal from Water

Water with a sulfates content between 800-2500 mg/L to be treated was mixed with a solution of 25 wt % barium chloride ($BaCl_2 500\ 2H_2O$). A precipitate immediately formed. This precipitate was a fine white precipitate of barium sulfate ($BaSO_4$ also known as barite). After as little as 10 minutes, the precipitate begins to drop to the bottom of the container on its own. After 1 hour, the solution of barium chloride had completely precipitated the sulfates as $BaSO_4$, and the water was removed by filtration for use or disposal.

Other techniques that may be used to assist in the precipitation and removal of the barium sulfate include, but are not necessarily limited to, flocculation, a weir tank, a hydrocyclone, centrifugation and the like, and combinations thereof.

EXAMPLE 2

Barite Analysis 4.9300 grams of precipitated barite produced in Example 1 was added to 100 mL of 1.15% glacial acetic acid solution and mixed for 16 hours. After mixing, the sample was filtered through a 0.45 micron filter and analyzed by ICP (Inductively Coupled Plasma mass spectroscopy) for heavy metals (silver, arsenic, barium, cadmium, chromium, mercury, lead, and selenium). The results are shown in Table I for mg/L for each element, as well as the detection limit and maximum allowable concentration by TCLP. The resulting water sample was also analyzed using the standard water management analysis format by ICP water analysis; the results are presented in Table II. This gives the alkali metals and alkali earths (API Specifications for barite are less than 250 ppm hardness as calcium).

TABLE I

TCLP Data for Precipitated Barite

| Element | Instrument Detection Limit (mg/L) | Sample (mg/L) | Maximum Allowable (mg/L) |
|---|---|---|---|
| Silver | 0.06 | BDL | 5.0 |
| Arsenic | 0.26 | BDL | 5.0 |
| Barium | 0.02 | 1.01 | 100 |
| Cadmium | 0.01 | BDL | 1.0 |
| Chromium | 0.02 | BDL | 5.0 |
| Mercury | 0.09 | BDL | 0.2 |
| Lead | 0.05 | BDL | 1.0 |
| Selenium | 0.10 | BDL | 5.0 |

BDL = Below Detection Limit

TABLE II

Water Analysis of Barite Extract

| Element | Amount (mg/L) | API Specifications for Barite |
|---|---|---|
| Aluminum | 0.05 | — |
| Boron | 0.03 | — |
| Barium | 0.89 | — |
| Calcium | 59.8 | 250 maximum |
| Copper | 0.01 | — |
| Iron | 0.23 | — |
| Potassium | 5.13 | — |
| Magnesium | 0.55 | — |
| Molybdenum | 0.00 | — |
| Sodium | 52.1 | — |
| Phosphorous | 0.11 | — |
| Sulfur (as SO4) | 76.6 | — |
| Silica | 0.06 | — |
| Strontium | 0.03 | — |
| Zinc | 0.02 | — |

Sulfates ($SO_4$) may be removed efficiently from the acid mine drainage water with the addition of barium chloride ($BaCl_2.2H_2O$) by the method described herein to make frac usable water and barium sulfate ($BaSO_4$) precipitate. The final product will be $BaSO_4$ of very high quality and grade and essentially sulfates-free water. The gravity of the $BaSO_4$ will be approaching 4.4, and the amount of soluble calcium present will be within API specifications. A TCLP Extraction of the produced barite shows no heavy metals detected other than barium which is present in less than the limit for soluble barium by TCLP (see Table I). Therefore, from an API quality standpoint, this is a commercial product. In fact, since the API gravity specifications for barite are 4.2 minimum, and this precipitated barite will exceed that by a large amount (between 4.3-4.4 gravity), it may be used to dilute back lower quality barite or simply sold as is. Additionally, the produced water from this process will meet the needs of pressure pumping for frac water quality after the sulfates have been removed. No further treatment will be necessary other than the removal of the barite from the water.

It is to be understood that the invention is not limited to the exact details of procedures, operation, exact materials, or embodiments shown and described, as modifications and equivalents will be apparent to one skilled in the art. Accordingly, the invention is therefore to be limited only by the spirit and scope of the appended claims. Further, the specification is to be regarded in an illustrative rather than a restrictive sense. For example, specific combinations of sulfate-containing water, barium chloride aqueous solutions, flocculants, separation processes used therein, untreated waters, treatment conditions, and the like, falling within the claimed parameters, but not specifically identified or tried in a particular method, are anticipated to be within the scope of this invention.

The terms "comprises" and "comprising" in the claims should be interpreted to mean including, but not limited to, the recited elements.

The present invention may suitably comprise, consist or consist essentially of the elements disclosed and may be practiced in the absence of an element not disclosed. For instance, there may be provided a method of reducing or removing at least one sulfate from water consisting essentially of or consisting of contacting water comprising at least one sulfate at a first sulfate concentration with an effective amount of an aqueous solution of barium chloride in an amount effective to react at least part of the sulfate with the barium chloride to form barium sulfate. The method may further consist essentially of or consist of precipitating at least part of the barium sulfate, and removing the precipitated barium sulfate and recovering water having a second sulfate concentration smaller than the first sulfate concentration. Alternatively, the method may further consist essentially of or consist of formulating a fracturing fluid with the recovered water.

What is claimed is:

1. A method of reducing or removing at least one sulfate from acidic water comprising:
   contacting acidic water comprising at least one sulfate at a first sulfate concentration with an effective amount of an aqueous solution of barium chloride in an amount effective to react at least part of the sulfate with the barium chloride to form barium sulfate;
   precipitating at least part of the barium sulfate; and
   removing the precipitated barium sulfate and recovering water having a second sulfate concentration smaller than the first sulfate concentration.

2. The method of claim 1 where the concentration of barium chloride in the aqueous solution of barium chloride ranges from about 10 wt % to about 35 wt %.

3. The method of claim 2 where the aqueous solution of barium chloride comprises an amount of carbonates or bicarbonates that is less than 100 mg/L.

4. The method of claim 1 where the effective amount of barium chloride within the aqueous solution ranges from about 0.025 vol % to about 3 vol % based on the total volume of acidic water being contacted.

5. The method of claim 1 where the amount of sulfate in the recovered water ranges from about 100 to about 300 mg/L.

6. The method of claim 1 where the acidic water is selected from the group consisting of acid mine drainage (AMD), acid metalliferous drainage, acid rock drainage (ARD), ground water, industry water, oilfield produced water, flowback water, and combinations thereof.

7. The method of claim 1 further comprising formulating a fracturing fluid with the recovered water.

8. The method of claim 1 where the recovered barium sulfate is at least 99 wt % pure.

9. The method of claim 1 further comprising adding a flocculant to the acidic water after contacting the water with the aqueous solution of barium chloride.

10. A method of reducing or removing at least one sulfate from water comprising:
    contacting water comprising at least one sulfate at a first sulfate concentration with an aqueous solution of barium chloride to at least partially react the at least one sulfate with the barium chloride to form barium sulfate, where the concentration of barium chloride in the aqueous solution of barium chloride ranges from about 10 wt % to about 35 wt % and where the aqueous solution of barium chloride ranges from about 0.025 vol % to about 3 vol %;
    at least partially separating the barium sulfate from the water;
    recovering water having a second sulfate concentration smaller than the first sulfate concentration; and
    formulating a fracturing fluid with the recovered water.

11. The method of claim 10 where the aqueous solution of barium chloride comprises carbonates or bicarbonates in an amount less than about 100 mg/L.

12. The method of claim 10 where the amount of sulfate in the recovered water ranges from about 100 to about 300 mg/L.

13. The method of claim 10 where the water comprising at least one sulfate is selected from the group consisting of acid mine drainage (AMD), acid metalliferous drainage, acid rock drainage (ARD), ground water, waste water, industry water, oilfield produced water, flowback water, and combinations thereof.

14. The method of claim 10 where the barium sulfate recovered is 99 wt % pure.

15. The method of claim 10 further comprising adding a flocculant to the water after contacting the water with the aqueous solution of barium chloride.

16. A method of reducing or removing at least one sulfate from water comprising:
    contacting water comprising at least one sulfate at a first sulfate concentration with an effective amount of an aqueous solution of barium chloride in an amount effective to at least partially react the at least one sulfate with the barium chloride to form barium sulfate, where the water is selected from the group consisting of acid mine drainage (AMD), acid metalliferous drainage, acid rock drainage (ARD), ground water, waste water, industry water, oilfield produced water, flowback water, and combinations of these;
    at least partially separating the barium sulfate from the water;
    recovering water having a second sulfate concentration smaller than the first sulfate concentration where the amount of sulfate in the recovered water ranges from about 100 to about 300 mg/L; and
    formulating a fracturing fluid with the recovered water.

17. The method of claim 16 where the concentration of barium chloride in the aqueous solution of barium chloride ranges from about 10 wt % to about 35 wt %.

18. The method of claim 17 where the aqueous solution of barium chloride comprises carbonates or bicarbonates in an amount less than about 100 mg/L.

19. The method of claim 16 where the effective amount of the aqueous solution of barium chloride ranges from about 0.025 vol % to about 3 vol % based on the total volume of water being contacted.

20. The method of claim 16 where the barium sulfate recovered is 99 wt % pure.

* * * * *